United States Patent Office 3,772,341
Patented Nov. 13, 1973

3,772,341
SUBSTITUTED 2,5-DIPHENYL-3,4,6-TRIHYDROXY-
$\Delta^{2,4}$-HEXADIENOIC ACID LACTONES (1,4)
Blaine M. Sutton, Hatboro, Pa., assignor to
Smithkline Corporation, Philadelphia, Pa.
No Drawing. Filed June 1, 1971, Ser. No. 148,890
Int. Cl. C07d 5/10
U.S. Cl. 260—343.6                     2 Claims

ABSTRACT OF THE DISCLOSURE 2,5-diphenyl-3,4,6-trihydroxy-$\Delta^{2,4}$-hexadienoic acid lactones (1,4) in which the phenyl moieties are each optionally substituted by chlorine, bromine, fluorine, methyl, methoxy, dimethoxy, trimethoxy or trifluoromethyl and having anti-arthritic activity are generally prepared by diborane reduction of corresponding pulvinic acid derivatives.

This invention relates to novel substituted 2,5-diphenyl-3,4,6-trihydroxy-$\Delta^{2,4}$-hexadienoic acid lactones (1,4) having useful pharmacodynamic activity. More specifically the compounds of this invention have anti-arthritic activity as measured by their ability to inhibit adjuvant-induced polyarthritis in rats. Thus the compounds of this invention decrease the inflamed hind leg volumes in experimental rats when compared to controls at oral doses of 25 mg./kg./day. At doses up to 100 mg./kg. orally in rats no pharmacological effects are observed.

The compounds of this invention are represented by the following structural formula:

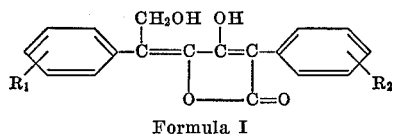

Formula I wherein $R_1$ and $R_2$ each represent hydrogen, chlorine, bromine, fluorine, methyl, methoxy, dimethoxy, trimethoxy or trifluoromethyl.

The compounds of Formula I above are prepared by reduction of the corresponding pulvinic acid derivative having the formula:

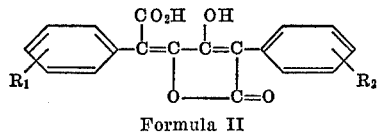

Formula II in which $R_1$ and $R_2$ are as defined above. Preferably, the compounds of Formula II are reduced with an agent such as diborane in a nonreactive organic solvent for example tetrahydrofuran. Alternatively the corresponding methyl ester, for example vulpinic acid, is reduced with diborane to give the products of Formula I.

The compounds of Formula II employed herein as intermediates are either known or are prepared by the synthetic method outlined below:

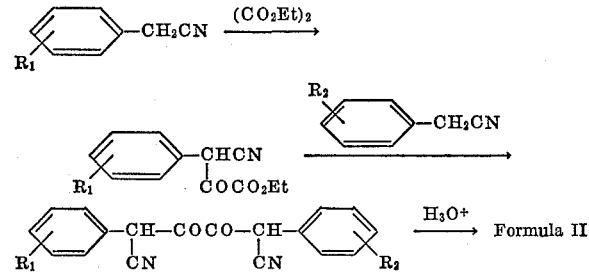

Thus a phenylacetonitrile is condensed with ethyl oxalate in an alcoholic solution of an alkali metal lower alkoxide, such as sodium methoxide or ethoxide, to give the ethyl 3-cyano-3-phenylpyruvate. This compound is further condensed with a phenylacetonitrile in an alcoholic solution of an alkali metal lower alkoxide, such as sodium methoxide or ethoxide, to yield the 2,5-diphenyl-3,4-dioxoadiponitrile. The above condensations may also be carried out using a metal hydride, such as sodium hydride, in diglyme. The adiponitrile derivative is refluxed for a short period of time, for example one or two hours, in an aqueous acid solution such as water/glacial acetic acid/concentrated sulfuric acid mixture to give the desired pulvinic acid of Formula II above. Where $R_1$ and $R_2$ are different, a mixture of isomers may arise which are conveniently separated, following reduction as described above, by fractional recrystallization or chromatography.

The compounds of this invention are administered in conventional dosage unit forms by incorporating an amount sufficient to produce anti-arthritic activity with a nontoxic pharmaceutical carrier according to accepted procedures. Preferably, the dosage units will contain a compound of Formula I in an amount of from about 25 mg. to about 100 mg. per unit.

The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, water and the like. Similarly, the carrier or diluent include any time delay material well known to the art, such as glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form or in the form of a troche or lozenge. The amount of solid carrier will vary widely but preferably will be from about 25 mg. to about 1 g. If a liquid carrier is used, the preparation will be in the form of a syrup, emulsion, soft gelatin capsule, sterile injectable liquid such as an ampule or an aqueous or nonaqueous liquid suspension.

The method of producing anti-arthritic activity in accordance with this invention comprises administering internally to an animal organism a compound of Formula I above, usually combined with a pharmaceutical carrier, in an amount sufficient to produce anti-arthritic activity without limiting side effects. The active medicament will be administered in a dosage unit, as described above, orally or parenterally, the oral route being preferred. Advantageously equal doses will be administered one or two times daily with the daily dosage regimen being from about 25 mg. to about 200 mg. When the method described above is carried out anti-arthritic activity is produced with a minimum of side effects.

The pharmaceutical preparations are made following the conventional techniques of the pharmaceutical chemist involving mixing, granulating and compressing when necessary, or variously mixing and dissolving the ingredients as appropriate to the desired end product.

The following examples illustrate the preparation of compounds of this invention and their incorporation into pharmaceutical compositions, and as such are not to be considered as limiting the invention set forth in the claims appended hereto.

EXAMPLE 1

A mixture of 117.1 g. (1.0 m.) of phenylacetonitrile and 326 ml. (2.4 m.) of ethyl oxalate is added to an ethanol solution of sodium ethoxide (prepared by dissolving 23.8 g., 1.08 m. of sodium in 500 ml. of absolute ethanol) and refluxed two hours. After cooling, diluting with 2500 ml. of water and extracting with ether, the solution is acidified with acetic acid. The solid is removed and washed with water to give ethyl 3-cyano-3-phenylpyruvate, M.P. 127–129° C.

Ethyl 3-cyano-3-phenylpyruvate (50.0 g., 0.23 m.) and 41.0 g. (0.35 m.) of phenylacetonitrile are added to an alcoholic solution of sodium ethylate [prepared from 13.4 g. (0.58 g. atom) of sodium and 360 ml. of absolute ethanol] and the resulting yellow solution is refluxed for one and three-quarter hours. The cooled solution is diluted with 700 ml. of water and acidified by slow addition of acetic acid. After further cooling in ice, the suspension is filtered and the removed solid washed with water and dried to give 2,5-diphenyl-3,4-dioxoadiponitrile, M.P. 284–286° C. (d.).

A mixture of 30.0 g. (0.104 m.) of 2,5-diphenyl-3,4-dioxoadiponitrile in 260 ml. of water, 380 ml. of glacial acetic acid and 190 ml. of concentrated sulfuric acid is refluxed for one hour. The suspension is cooled, poured onto 900 ml. of ice-water and the solid removed and washed to give pulvinic acid, M.P. 215–216.5° C.

A solution of 3.08 g. (0.01 m.) of pulvinic acid in 30 ml. of dry tetrahydrofuran is added slowly to 15 ml. of a solution of diborane in dry tetrahydrofuran (0.2 molar) at −10° C. The resulting mixture is stirred for three and one-half hours at room temperature, decomposed with methanol and evaporated to dryness to give 2,5-diphenyl-3,4,6-trihydroxy-$\Delta^{2,4}$-hexadienoic acid lactone (1,4), M.P. 152–152.5° C.

EXAMPLE 2

A mixture of 45.3 g. (0.31 m.) of p-chlorophenylacetonitrile and 107 g. (0.72 m., 99 ml.) of diethyl oxalate in an alcoholic sodium ethylate solution [prepared by dissolving 7.13 g. (0.31 m.) of sodium in 120 ml. of absolute ethanol] is refluxed with stirring for two hours. The cooled reaction mixture is diluted with 700 ml. of water, acidified with acetic acid and cooled to ice bath temperature. The resulting solid is recrystallized from aqueous methanol to give ethyl 3-cyano-3-(p-chlorophenyl)-pyruvate, M.P. 134–135° C.

Ethyl 3-(p-chlorophenyl)-3-cyanopyruvate (40 g., 0.16 m.) and p-chlorophenylacetonitrile (49.8 g., 0.33 m.) are added to an alcoholic solution of sodium ethylate [prepared from 7.36 g., (0.32 g. atom) of sodium and 190 ml. of absolute ethanol] and the resulting solution is refluxed for two hours. The reaction mixture is diluted with water, acidified with acetic acid and cooled to ice bath temperature to yield 2,5-di-(p-chlorophenyl)-3,4-dioxoadiponitrile, M.P. 280° C.

A solution of 15 g. (0.042 m.) of 2,5-di-(p-chlorophenyl)-3,4-dioxoadiponitrile in a mixture of 150 ml. of water, 210 ml. of acetic acid and 105 ml. of concentrated sulfuric acid is stirred and refluxed for two hours. The reaction mixture is diluted with 500 ml. of water and cooled to ice bath temperature to yield 4,4'-dichloropulvinic acid, M.P. 255° C. The acid in tetrahydrofuran solution is added to a similar solution of diborane as described in Example 1 to yield upon workup the product, 2,5-di-(4'-chlorophenyl)-3,4,6-trihydroxy-$\Delta^{2,4}$-hexadienoic acid lactone (1,4).

Similarly, by employing m-chlorophenylacetonitrile in the initial reaction described above to obtain ethyl 3-cyano-3-(m-chlorophenyl)-pyruvate, M.P. 72–74° C., followed by reaction with m-chlorophenylacetonitrile and the subsequent synthetic steps there is prepared 2,5-di-(3'-chlorophenyl)-3,4,6-trihydroxy-$\Delta^{2,4}$-hexadienoic acid lactone (1,4).

EXAMPLE 3

Following the procedures outlined in Examples 1 and 2, p-methoxyphenylacetonitrile is reacted with diethyl oxalate in alcoholic sodium ethoxide solution to give ethyl 3-cyano-3-(p-methoxyphenyl)-pyruvate which is then similarly reacted with phenylacetonitrile to yield 2-(p-methoxyphenyl)-5-phenyl-3,4-dioxoadiponitrile, M.P. 256–258° C.

A solution of the adiponitrile in water, acetic acid and concentrated sulfuric acid is refluxed for two hours and the resulting crude mixture of 4- and 4'-methoxypulvinic acid dissolved in tetrahydrofuran is added to a solution of diborane in tetrahydrofuran as described in Example 1. Upon similar workup and evaporation to dryness, the solid obtained is fractionally recrystallized to separate 2-(4'-methoxyphenyl)-5-phenyl-3,4,6-trihydroxy-$\Delta^{2,4}$-hexadienoic acid lactone (1,4) and 2-phenyl-5-(4'-methoxyphenyl)-3,4,6-trihydroxy-$\Delta^{2,4}$-hexadienoic acid lactone (1,4).

EXAMPLE 4

Following the procedures outlined in Examples 1 and 2, p-methylphenylacetonitrile and diethyl oxalate are reacted in alcoholic sodium ethoxide to obtain ethyl 3-cyano-3-(p-methylphenyl)-pyruvate, 86–88° C. The latter is reacted with p-methylphenylacetonitrile to give 2,5-di-(p-methylphenyl)-3,4-dioxoadiponitrile, M.P. 270–272° C.

The adiponitrile is refluxed with water, acetic acid and concentrated sulfuric acid to give 4,4'-dimethylpulvinic acid, M.P. 246–250° C., which is reduced with diborane in tetrahydrofuran solution to yield 2,5-di-(4'-methylphenyl)-3,4,6-trihydroxy-$\Delta^{2,4}$-hexadienoic acid lactone (1,4).

EXAMPLE 5

By employing the procedures set forth in Examples 1 and 2, p-fluorophenylacetonitrile is reacted with diethyl oxalate in alcoholic sodium ethoxide to give ethyl 3-cyano-3-(p-fluorophenyl)-pyruvate. Reaction of the latter under similar conditions with p-fluorophenylacetonitrile results in 2,5-di-(p-fluorophenyl)-3,4-dioxoadiponitrile.

The adiponitrile is refluxed in water, acetic acid and concentrated sulfuric acid to yield 4,4'-difluoropulvinic acid which is reduced with diborane to obtain 2,5-di-(4'-fluorophenyl)-3,4,6-trihydroxy-$\Delta^{2,4}$-hexadienoic acid lactone (1,4).

Similarly, by utilizing m-trifluoromethylphenyl-acetonitrile as the initial reactant as described above there is ultimately produced 2,5-di-(3'-trifluoromethylphenyl)-3,4,6-trihydroxy-$\Delta^{2,4}$-hexadienoic acid lactone (1,4).

EXAMPLE 6

As described in Example 1, ethyl 3-cyano-3-phenylpyruvate is reacted with 3,4,5-trimethoxyphenylacetonitrile in an alcoholic solution of sodium ethoxide to give 2-(3',4',5'-trimethoxyphenyl)-5-phenyl-3,4-dioxoadiponitrile. The latter is refluxed in a mixture of water, glacial acetic acid and concentrated sulfuric acid to give a mixture of 3,4,5- and 3',4',5'-trimethoxypulvinic acid which is reduced with diborane in tetrahydrofuran solution. The solid obtained upon evaporation to dryness is fractionally recrystallized to separate 2-phenyl-5-(3',4',5'-trimethoxyphenyl)-3,4,6-trihydroxy-$\Delta^{2,4}$-hexadienoic acid lactone (1,4) and 2-(3',4',5'-trimethoxyphenyl)-5-phenyl-3,4,6-trihydroxy-$\Delta^{2,4}$-hexadienoic acid lactone (1,4).

EXAMPLE 7

By following the procedures outlined in Examples 1 and 2, 3,4-dimethoxyphenylacetonitrile is reacted with diethyl oxalate in alcoholic sodium ethoxide solution to give ethyl 3-cyano-3-(3',4'-dimethoxyphenyl)-pyruvate, M.P. 139–140° C. This compound is similarly reacted with 3,4-dimethoxyphenylacetonitrile which results in the formation of 2,5-di-(3',4'-dimethoxyphenyl)-3,4-dioxoadiponitrile. The latter is refluxed with water, acetic acid and sulfuric acid to obtain 3,4,3',4'-tetramethoxypulvinic acid, 285° C., which is reduced with diborane to give 2,5-di-(3',4'-dimethoxyphenyl)-3,4,6-trihydroxy-$\Delta^{2,4}$-hexadienoic acid lactone (1,4).

Similarly, by employing p-methoxyphenylacetonitrile as the initial reactant as described above there is obtained as the final product, 2,5-di-(4'-methoxyphenyl)-3,4,6-trihydroxy-$\Delta^{2,4}$-hexadienoic acid lactone (1,4).

EXAMPLE 8

A solution of 1.0 g. (0.0031 m.) of vulpinic acid in 4 ml. of dry tetrahydrofuran is slowly added to 4 ml. of a solution of diborane in dry tetrahydrofuran (0.1 molar) at 0° C. The resulting mixture is stirred for two and one-half hours at 0° C., one hour at room temperature, decomposed with methanol and evaporated to dryness to give 2,5-diphenyl-3,4,6-trihydroxy-$\Delta^{2,4}$-hexadienoic acid lactone (1,4), M.P. 152–153° C., identical to that prepared in Example 1.

EXAMPLE 9

| Ingredients: | Mg./tablet |
|---|---|
| 2,5 - diphenyl - 3,4,6 - trihydroxy - $\Delta^{2,4}$-hexadienoic acid lactone (1,4) | 50 |
| Calcium sulfate, dihydrate | 150 |
| Sucrose | 25 |
| Starch | 15 |
| Talc | 5 |
| Stearic acid | 3 |

The sucrose, calcium sulfate and acid lactone are thoroughly mixed and granulated with hot 10% gelatin solution. The wetted mass is passed through a No. 6 mesh screen directly onto drying trays. The granules are dried at 120° F. and passed through a No. 20 mesh screen, mixed with the starch, talc and stearic acid and compressed into tablets.

EXAMPLE 10

| Ingredients: | Mg./capsule |
|---|---|
| 2,5 - diphenyl - 3,4,6 - trihydroxy - $\Delta^{2,4}$-hexadienoic acid lactone (1,4) | 100 |
| Magnesium stearate | 5 |
| Lactose | 350 |

The above ingredients are screened through a No. 40 mesh screen, mixed and filled into No. 0 hard gelatin capsules.

What is claim is:

1. A chemical compound of the formula:

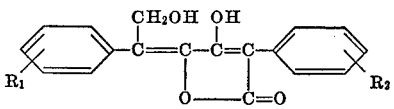

wherein $R_1$ and $R_2$ are each hydrogen, chlorine, bromine, fluorine, methyl, methoxy, dimethoxy, trimethoxy, or trifluoromethyl.

2. A compound according to claim 1 in which $R_1$ and $R_2$ are hydrogen.

References Cited
UNITED STATES PATENTS 3,676,464   7/1972   Toden et al. _____ 260—343.6

DONALD G. DAUS, Primary Examiner

A. M. T. TIGHE, Assistant Examiner

U.S. Cl. X.R.

260—465 D, 465 F, 465 G, 465 H; 424—279